L. A. KEENE & M. R. PHARIS.
MANURE SPREADER.
APPLICATION FILED OCT. 16, 1911.
1,047,071.
Patented Dec. 10, 1912.
2 SHEETS—SHEET 1.
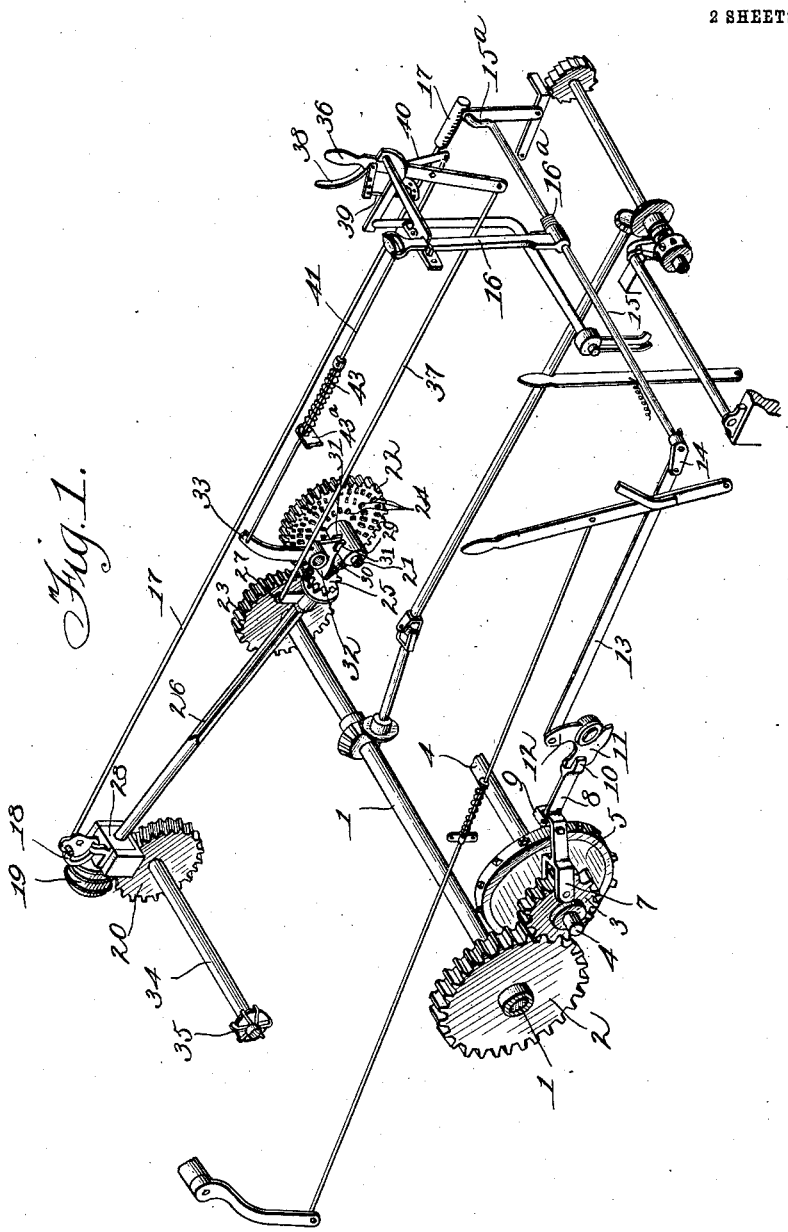
Witnesses:
J. C. Devick.
G. Paul Parker.
Inventors:
Louis A. Keene
Mott R. Pharis
By Luther L. Miller
Atty.

L. A. KEENE & M. R. PHARIS.
MANURE SPREADER.
APPLICATION FILED OCT. 16, 1911.
1,047,071.
Patented Dec. 10, 1912.
2 SHEETS—SHEET 2.
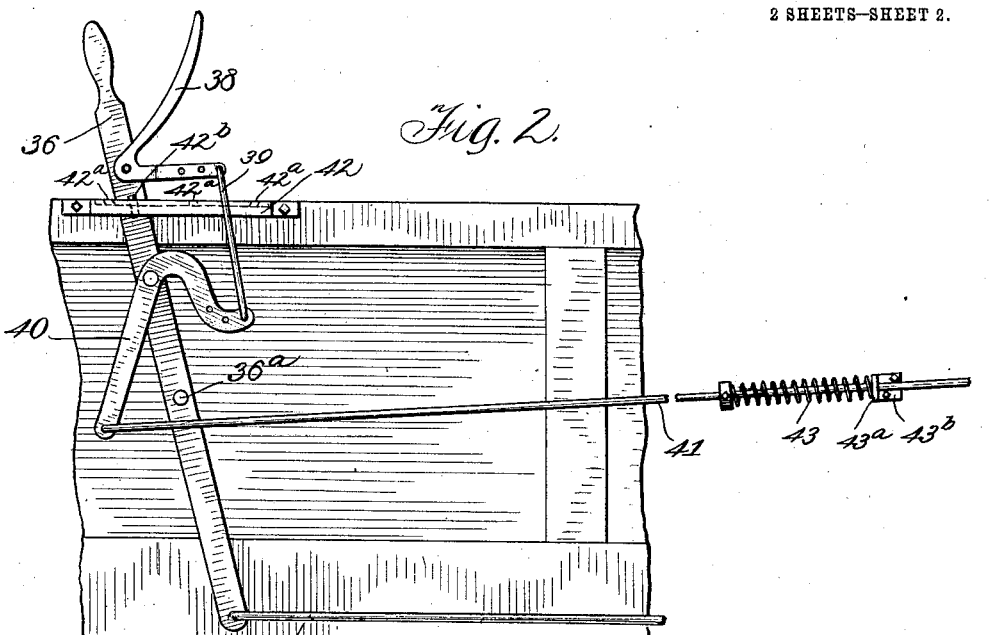
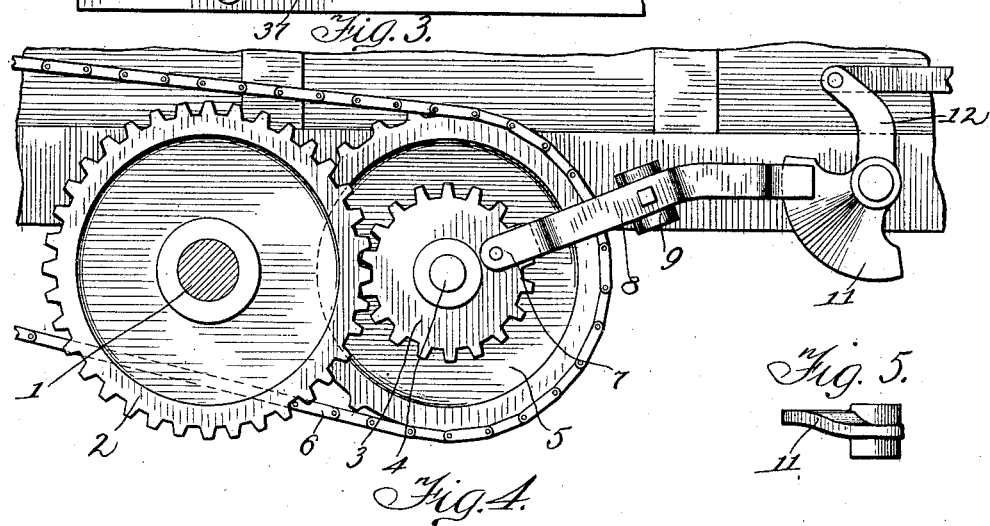
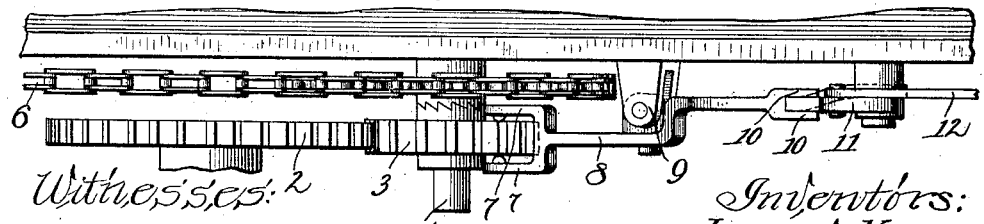
Inventors:
Louis A. Keene
Mott R. Pharis
By Luther L. Miller
Atty.

UNITED STATES PATENT OFFICE.

LOUIS A. KEENE, OF WATERMAN, AND MOTT R. PHARIS, OF CHICAGO, ILLINOIS.

MANURE-SPREADER.

1,047,071.

Specification of Letters Patent.

Patented Dec. 10, 1912.

Application filed October 16, 1911. Serial No. 654,831.

*To all whom it may concern:*

Be it known that we, LOUIS A. KEENE and MOTT R. PHARIS, citizens of the United States, residing, respectively, at Waterman, in the county of Dekalb and State of Illinois, and Chicago, in the county of Cook and State of Illinois, have invented certain new and useful Improvements in Manure-Spreaders, of which the following is a specification.

The invention refers to manure spreaders, and one of its objects is to enable the operator, by the movement of a single lever, to shift the gear so as to change the speed of the apron or feeding mechanism of the spreader.

Another object of the invention is to provide a more simple and effective device for stopping the entire mechanism of a manure spreader at the will of the operator.

We have chosen to illustrate our present improvements as applied to a manure spreader of the construction shown in Patents Nos. 773,505 and 819,659, although it is to be understood that said improvements are equally susceptible of use in connection with manure spreaders of other constructions. No limitation therefore is intended by the reference to our patents above noted.

In the accompanying drawings, Figure 1 is a perspective view showing the mechanism for operating the apron-traveling means and the spreader-cylinder-rotating means. Fig. 2 is a detail view showing in side elevation the operating lever for disengaging, changing, and reëngaging the gear which actuates the apron-traveling mechanism, also the means for locking said lever in an operative position. Fig. 3 is a side elevation showing the mechanism for transmitting power from the traction wheels to the cylinder-rotating mechanism, and also the device for disengaging the clutch. Fig. 4 is a top plan view of the same. Fig. 5 is a detail view of the cam wing shown in Fig. 3.

The manure spreader disclosed in the aforesaid patents comprises a vehicle in the form of a wagon, the bottom of the wagon box being made up of an apron mounted upon a series of rollers at each side of said box and along the middle line thereof, and being thus adapted to be moved longitudinally of the wagon box. The rear end of the wagon box is occupied by a spreader cylinder mounted in suitable bearings. The rear wheels of the wagon are traction wheels and have a pawl and ratchet connection with their supporting shaft.

In the drawings, 1 is the supporting shaft for the traction wheels, 2 is a spur gear fixed to the said shaft and engaging the spur pinion 3 which is loosely mounted on the outer end of the shaft 4.

5 is a sprocket wheel fixed to the shaft 4, and the said sprocket wheel is connected by means of the endless chain belt 6 with a similar sprocket wheel on the spreader cylinder shaft (not shown). The adjacent faces of the hubs of the spur pinion 3 and the sprocket wheel 5 are provided with engaging clutch teeth, as shown in Fig. 4. The sides of the pinion 3 are embraced by the two prongs 7 of a shifting lever 8 pivotally mounted in a bracket 9 on the side of the wagon body; by means of which shifting lever the pinion 3 is moved into and out of clutch engagement with the sprocket wheel 5. The forward end of the shifting lever 8 is also divided, its ends 10 embracing the flange of the cam wing 11, said cam wing being pivotally attached to the walls of the wagon box. The lever arm 12 of the cam wing is connected by means of the shifting rod 13, the crank arm 14 and the shaft 15 with the operating lever 16, which is fixed upon said shaft 15, and engaged by one end of a spring 16$^a$ coiled about said shaft, the other end of said spring bearing against the forward end of the wagon body or any other fixed member, said spring thus tending to throw said lever forward into a horizontal position.

From the foregoing it will be seen that an upward movement of the operating lever 16 turns the shaft 15, and through the shifting rod 13, rotates the cam wing 11 and moves the shifting lever 8, throwing the pinion 3 into clutch with the sprocket wheel 5, which, by means of the endless chain belt 6, rotates the spreader cylinder. The same turning of the shaft 15, acting through a crank-arm 15$^a$ and a connecting rod 17 upon a sector 18, throws a worm 19 into engagement with a worm wheel 20, imparting motion to the apron (not shown) of the spreader through a mechanism now to be described.

To traverse the apron backward during the spreading operation, the following described mechanism is provided. Upon a stub shaft 21 which is supported by a bearing bracket rigidly attached to the wagon body and not shown in the drawings, is rotatably mounted a spur gear 22 meshing with a similar gear 23. The inner face of said spur gear 22 is provided with several rings of teeth 24 of differing diameters, the teeth of which rings are adapted to mesh with a pinion 25 slidably mounted upon the squared portion of a shaft 26, and having an upwardly-extending arm 27 by means of which said pinion is moved longitudinally of its shaft. The shaft 26 is rotatably mounted in two bearing brackets 28 and 29, the latter bracket being in sleeve form surrounding the stub shaft 21 and having a bearing socket 30 for the forward end of said shaft 26. The sleeve portion of said bracket 29 is provided on its upper side with two ears 31 forming between them a transverse groove adapted to receive an oscillatory cam wing 32 fixed with relation to the operating arm 33. The opposite end of the shaft 26 carries a worm 19 fixed to said shaft and adapted to be moved into and out of engagement with the worm wheel 20 by means of the sector 18 and the connecting rod 17. The worm wheel 20 is fixed on the shaft 34, upon the other end of which is fixed a small sprocket wheel 35 carrying the endless chain (not shown) which moves the apron of the spreader.

The speed of the apron travel with relation to the rotative speed of the cylinder may be changed by means of the apparatus now to be described.

A gear-shifting lever 36 pivotally attached to the side of the wagon body at 36$^a$ is connected by means of the rod 37 with the arm 27 of the pinion 25. Pivotally attached to the upper or handle portion of the said gear-shifting lever is a bell-crank lever 38 having its upper arm lying adjacent to the handle of the lever 36 and its lower arm connected by means of the link 39 with the bell-crank lever 40, which is also pivotally attached to the gear-shifting lever 36. The lower arm of the bell-crank lever 40 is connected by means of the rod 41 with the operating arm 33 of the cam wing 32. A spring 43 is coiled about the rod 41, one end engaging a stop fixed on the rod and the other end bearing against the stop 43$^a$, which is fixed to the side of the wagon-body by means of the bracket 43$^b$. When it is desired to change the speed of the apron, the operator grasps the handle of the lever 36, and in so doing presses forward the upper arm of the lever 38, thus rotating the cam wing 32 and throwing the pinion 25 out of engagement with one of the gear rings on the inner face of the spur gear 22. A movement of the lever 36 then moves the said pinion into coincidence with another one of said circular rows of gear teeth. The lever 36 is movable within the limits of a loop 42, and is slightly bent so as to press outwardly against such loop. On the inner face of the loop 42 are grooves 42$^a$ adapted to engage the spur 42$^b$ and thus lock the lever at one of the various positions corresponding to the desired position of the pinion 25. When the said pinion has thus been locked in its proper position on the shaft, the operator releases the handle of the lever and the said pinion is again thrown into engagement with the corresponding ring of gear teeth by means of the spring 43.

The apparatus herein shown may be changed in various ways without departing from the spirit and scope of our invention, wherefore we desire to have it understood that we do not limit ourselves to the specific construction herein shown and described.

We claim as our invention:

1. In a manure spreader, a bearing bracket slidably mounted; a bearing socket in said bracket; an oscillatory cam wing engaging said bearing bracket; an operating arm on said cam wing; a squared shaft turning in said bearing socket; a pinion slidably mounted on said shaft; a hand lever; a locking device for said lever; a rod connecting said hand lever with said pinion; a pair of bell cranks pivotally mounted on said hand lever; a link connecting said bell cranks; a rod connecting one of said bell cranks with said operating arm of the cam wing; and means for automatically reversing the movement of said operating arm.

2. In a manure spreader, in combination, a stub shaft; a gear mounted on said stub shaft; means for driving said gear; a bearing slidably mounted on said stub shaft; a squared shaft turning in said bearing; a pinion slidably mounted on said squared shaft; concentric rings of gear teeth on the inner face of the gear mounted on the stub shaft; means for moving the said pinion into and out of engagement with said gear teeth; means for sliding the said pinion backward and forward on said squared shaft; a single hand lever adapted to operate concurrently both of said means and thus to disengage the pinion and move it to a different position on said squared shaft; and means for automatically reëngaging said pinion with said gear teeth.

3. In a manure spreader, in combination, a stub shaft; a bearing bracket slidably mounted thereon; a bearing socket in said bearing bracket; a squared shaft turning in said bearing socket; a pinion slidably mounted thereon; concentric rings of gear teeth engaging said pinion; an oscillatory cam wing engaging said bearing bracket; an operating arm for said cam wing; a hand lever; a locking device for said lever; a rod connecting said lever with said pinion; a pair of bell cranks pivotally mounted on said lever; a link connecting said bell cranks; a rod connecting one of said bell cranks with said operating arm of the cam wing, whereby the said pinion may be disengaged from said gear teeth; and means for automatically reëngaging said pinion with said gear teeth.

4. In a manure spreader, in combination, a geared apron-driving mechanism; a gear-shifting mechanism for changing the apron speed; a mechanism for engaging and disengaging the gears of the apron-driving mechanism; a pivotally mounted hand lever; a locking device for said hand lever; a link connecting said hand lever with said gear-shifting mechanism; a pair of bell-crank levers pivotally mounted on said hand lever; a link connecting said bell-crank levers; a rod connecting one of said bell-crank levers with said engaging and disengaging mechanism; and a coiled spring so arranged as to hold said rod in a forward position when the said bell-crank levers are released.

5. In a manure spreader, in combination a shiftable gear; a pivotally mounted hand lever; a locking device for said hand lever; a gear-shifting link attached to the said hand lever at a point on the opposite side of the fulcrum from the handle of said hand lever; a bell-crank lever pivotally attached to the said hand lever on the same side of the fulcrum as the handle of said hand lever; a second bell-crank lever pivotally attached to the said hand lever on the same side of the fulcrum as the handle of said hand lever; a link connecting said bell-crank levers; a gear-engaging and gear-disengaging rod attached to the lower end of said second bell-crank lever; and a coiled spring so arranged as to hold said rod in a forward position when said bell-crank levers are released.

In testimony whereof we each affix our signatures in the presence of two witnesses.

LOUIS A. KEENE.
MOTT R. PHARIS.

Witnesses to signature of Louis A. Keene:
M. A. KEENE,
H. M. KEENE.

Witnesses to signature of Mott R. Pharis:
LINCOLN B. LUNT,
JOSEPH R. BARSE, Jr.

---

Copies of this patent may be obtained for five cents each, by addressing the "Commissioner of Patents, Washington, D. C."